United States Patent
Zhu et al.

(10) Patent No.: US 7,054,011 B2
(45) Date of Patent: May 30, 2006

(54) OPTICAL FIBER PRESSURE AND ACCELERATION SENSOR FABRICATED ON A FIBER ENDFACE

(75) Inventors: Yizheng Zhu, Blacksburg, VA (US);
Xingwei Wang, Blacksburg, VA (US);
Juncheng Xu, Blacksburg, VA (US);
Anbo Wang, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 10/911,635

(22) Filed: Aug. 5, 2004

(65) Prior Publication Data
US 2005/0062979 A1  Mar. 24, 2005

Related U.S. Application Data

(60) Provisional application No. 60/499,727, filed on Sep. 4, 2003.

(51) Int. Cl.
*G01B 9/02* (2006.01)
(52) U.S. Cl. ....................................... 356/480
(58) Field of Classification Search .............. 356/35.5, 356/477, 480, 519; 250/227.19, 227.27
See application file for complete search history.

(56) References Cited

U.S. PATENT DOCUMENTS

| | | | |
|---|---|---|---|
| 4,678,904 A * | 7/1987 | Saaski et al. | 250/277.27 |
| 4,848,999 A * | 7/1989 | Taylor | 65/407 |
| 5,528,367 A | 6/1996 | Putnam et al. | |
| 6,281,976 B1 * | 8/2001 | Taylor et al. | 356/480 |
| 2002/0159671 A1 | 10/2002 | Boyd et al. | |

OTHER PUBLICATIONS

Chen et al.; "Deep Wet Etching on Fused Silica Material for Fiber Optic Sensors"; Proceedings of SPIE—vol. 5342 Micromachining and Microfabrication Process Technology IX; Jan. 2004, pp. 128-136.

* cited by examiner

*Primary Examiner*—Gregory J. Toatley, Jr.
*Assistant Examiner*—Michael A. Lyons
(74) *Attorney, Agent, or Firm*—Whitham, Curtis, Christofferson & Cook, PC

(57) ABSTRACT

A fiber optic sensor has a hollow tube bonded to the endface of an optical fiber, and a diaphragm bonded to the hollow tube. The fiber endface and diaphragm comprise an etalon cavity. The length of the etalon cavity changes when applied pressure or acceleration flexes the diaphragm. The entire structure can be made of fused silica. The fiber, tube, and diaphragm can be bonded with a fusion splice. The present sensor is particularly well suited for measuring pressure or acceleration in high temperature, high pressure and corrosive environments (e.g., oil well downholes and jet engines). The present sensors are also suitable for use in biological and medical applications.

23 Claims, 4 Drawing Sheets

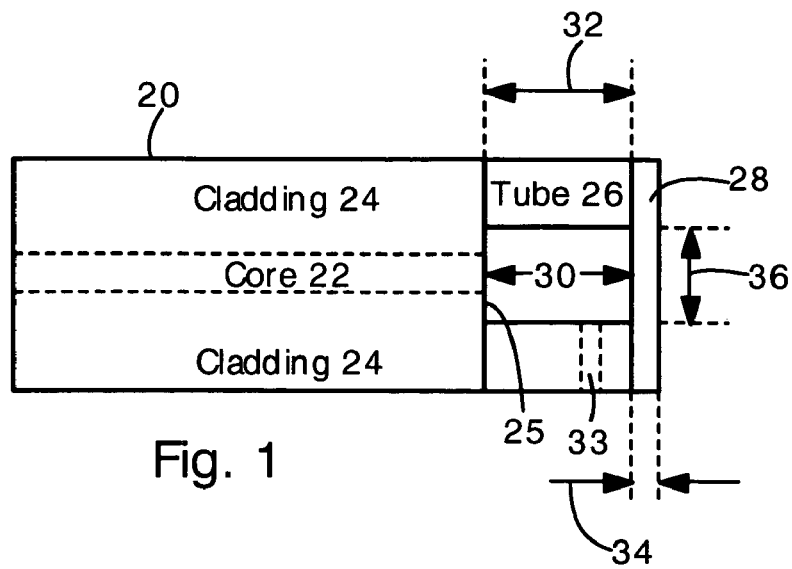
Fig. 1
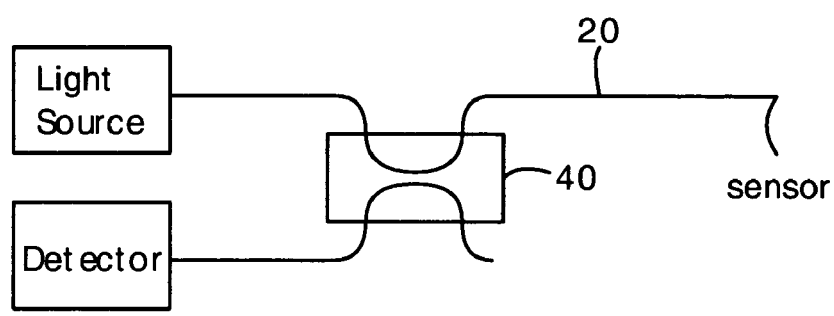
Fig. 2
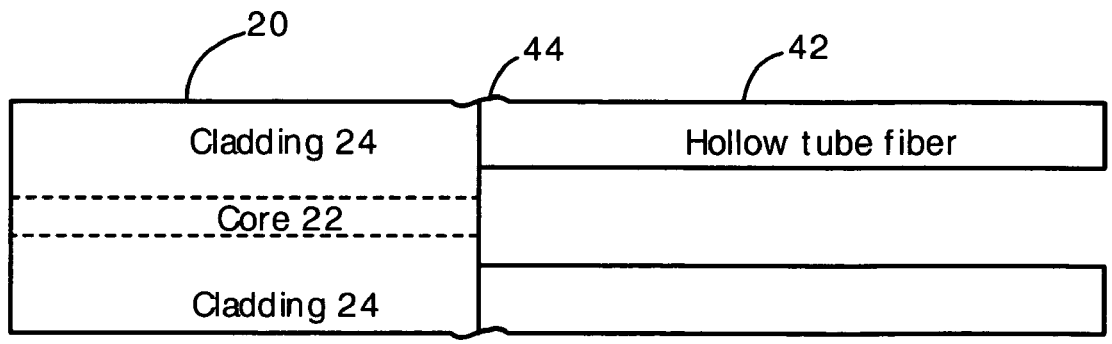
Fig. 3a  Splice fiber and tube

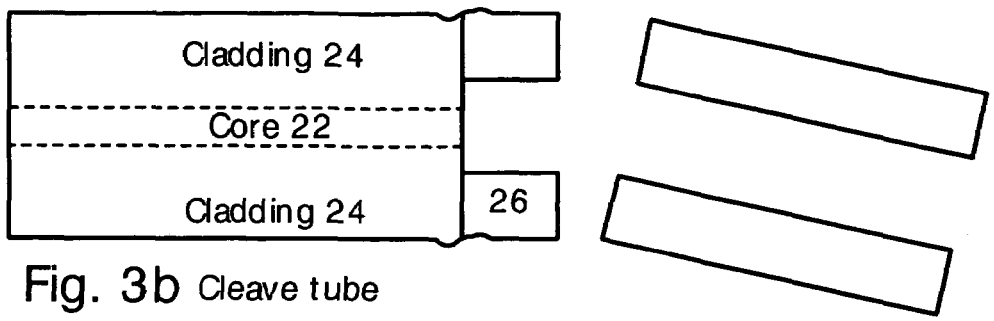
Fig. 3b Cleave tube
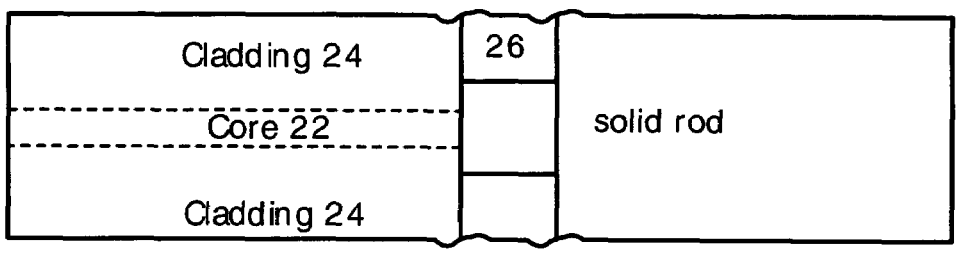
Fig. 3c Splice tube and rod
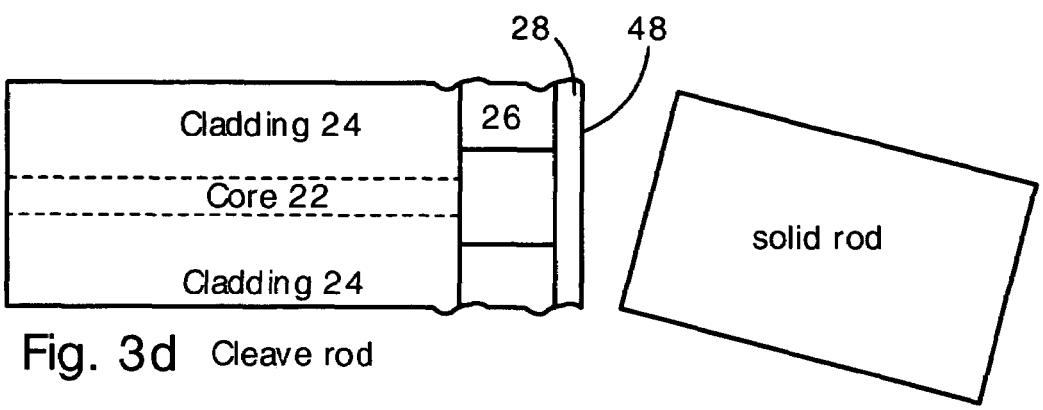
Fig. 3d Cleave rod
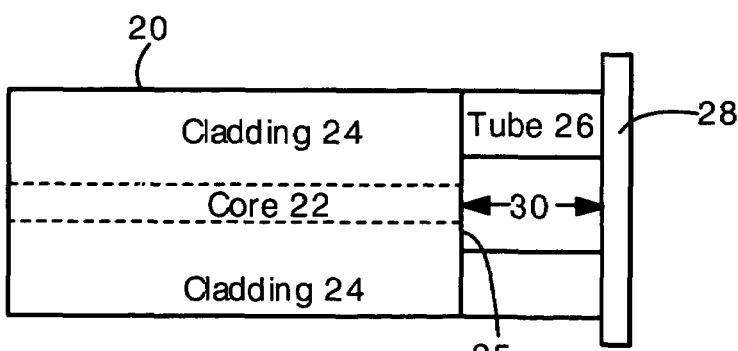
Fig. 4

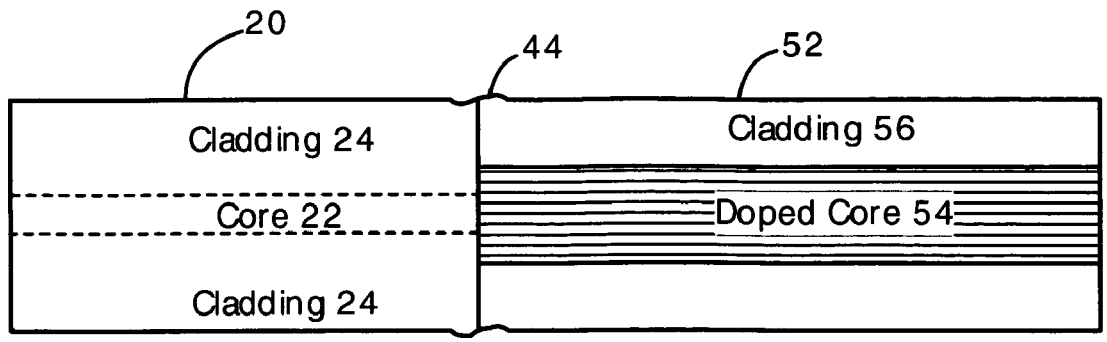
Fig. 5a Splice fiber and doped core fiber
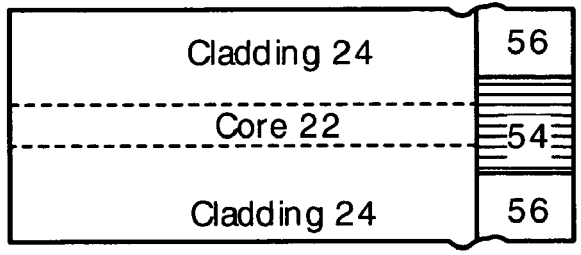
Fig. 5b Cleave doped core fiber
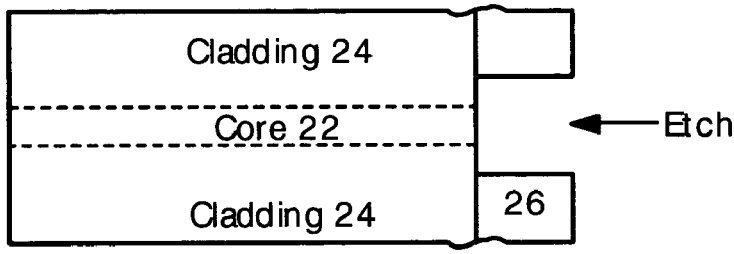
Fig. 5c Remove core by etching
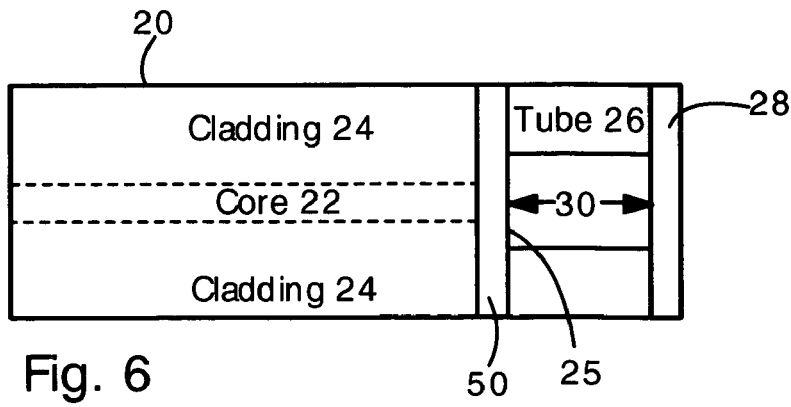
Fig. 6

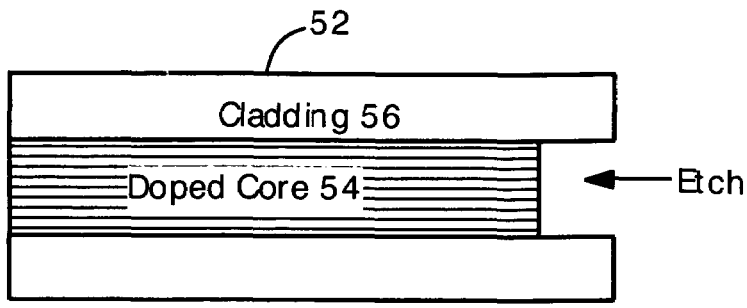
Fig. 7a  Recess core by etching
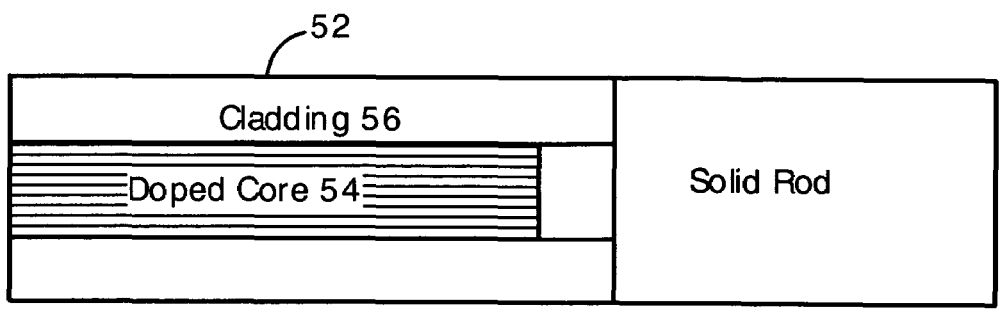
Fig. 7b  Splice cladding and rod
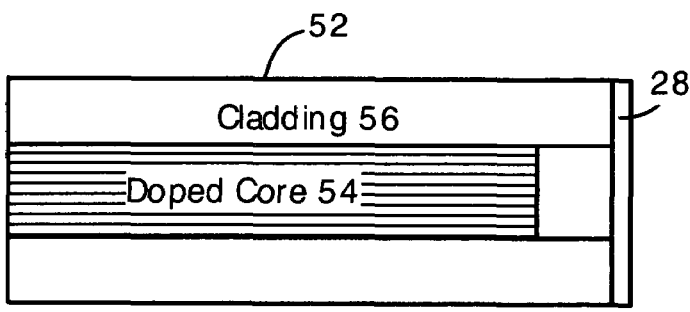
Fig. 7c  Cleave rod to form diaphragm
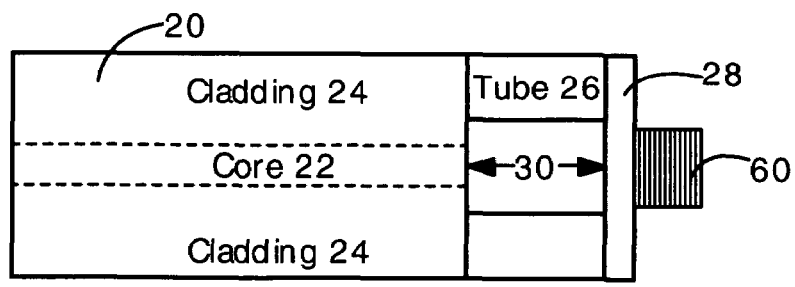
Fig. 8

OPTICAL FIBER PRESSURE AND ACCELERATION SENSOR FABRICATED ON A FIBER ENDFACE

CROSS-REFERENCE TO RELATED APPLICATIONS

The present application claims the benefit of priority from co-pending provisional application 60/499,727, filed on Sep. 4, 2003.

This invention was made under a grant from the Department of Energy (DOE contract number DE-FC36-01G011050). The U.S. government may have certain rights under any patent granted hereon.

FIELD OF THE INVENTION

The present invention relates generally to optical fiber pressure sensors and vibration and acceleration sensors. More particularly, the present invention relates to an optical fiber pressure sensor having an etalon cavity on an endface of an optical fiber. The pressure sensor is very small and capable of operation at high temperatures and in corrosive or chemically sensitive environments.

BACKGROUND OF THE INVENTION

Optical fiber pressure sensors are needed for measurement of pressure in extreme high temperature, high pressure and corrosive environments such as oil well downholes, jet engines, or power generation equipment. Also, pressure sensors for these locations must be very small since space is limited. These requirements impose severe constraints on the sensor design and material composition. Also, since temperature can fluctuate in extreme environments, the pressure sensor for these extreme environments will ideally have negligible sensitivity to temperature.

Optical fiber pressure sensors typically have a Fabry Perot etalon cavity optically coupled to the fiber. The etalon is constructed so that applied force or hydrostatic pressure causes the etalon cavity length to change. The etalon cavity length is remotely monitored optically. For example, the reflectivity of the etalon at a specific wavelength or group of wavelengths can be monitored. In this way, pressure is measured optically.

Conventional fiber optic pressure sensor designs are typically not suitable for applications in extreme environments. The presence of metals in a sensor, for example, precludes use at high temperature and in corrosive environments. Also, thermal expansion mismatch between different materials can cause changes in temperature to appear as changes in pressure.

It would be an advance in the art to provide an optical fiber pressure sensor that can be used at high temperatures and in corrosive environments. It would be particularly beneficial for the pressure sensor to be chemically inert, very small, insensitive to temperature changes, easily manufacturable and inexpensive.

SUMMARY OF THE INVENTION

The present invention includes an optical fiber pressure sensor having an optical fiber with an endface, and a hollow tube bonded to the endface. A pressure-sensitive diaphragm is bonded to the opposite end of the hollow tube. The hollow tube will typically be less than 250, 100, or 50 microns long. The fiber endface and diaphragm define an etalon cavity. The length of the etalon cavity changes with applied pressure.

Preferably, the hollow tube and diaphragm have an outer diameter approximately equal to an outer diameter of the optical fiber (e.g. from 10 microns to 1000 microns).

Preferably, the hollow tube, fiber and diaphragm are all made of the same material, for example fused silica. Alternatively, the diaphragm can be made of sapphire, which will provide a higher maximum operating temperature. Also, the diaphragm can be a slice of optical fiber, sapphire fiber, ceramic plate, sapphire plate, rod, or layers.

The fiber, hollow tube and diaphragm can be bonded by fusion splicing (e.g. with an electric-arc fusion splicer).

The diaphragm can have a chemically etched exterior surface, which is created when the diaphragm is thinned by etching.

An alternative embodiment of the present invention comprises an optical fiber with a relatively etchable core, and a relatively etch-resistant cladding (i.e., upon exposure to an etchant the core is etched and the cladding generally is not). The etchable core is recessed from exposure to etchant. A diaphragm is bonded to the etch-resistant cladding. The fiber and diaphragm can be made primarily of fused silica. In this case, the core can be doped with germanium or fluorine to render it more etchable than the cladding.

The present invention also includes a method for making an optical fiber pressure sensor by fusion splicing a hollow tube to an endface of an optical fiber, and then cleaving the hollow tube and fusion splicing a diaphragm to the hollow tube. This method requires only a fusion splicer and cleaver for fabricating the present pressure sensor. Optionally, the diaphragm thickness can be adjusted by exposing an exterior surface of the diaphragm to an etchant.

DESCRIPTION OF THE FIGURES

FIG. 1 shows a preferred embodiment of the present optical fiber pressure sensor.

FIG. 2 illustrates a method for using the present optical fiber pressure sensor.

FIGS. 3a–3d illustrate a preferred method for making the present optical fiber pressure sensor.

FIG. 4 shows an alternative embodiment in which the diaphragm is made from a wafer.

FIGS. 5a–5c illustrate an alternative method for making the present sensor in which the hollow tube is formed from by etching a doped core of a fiber.

FIG. 6 shows an alternative embodiment in which the fiber endface comprises an etchant protection layer.

FIGS. 7a–7c illustrate an alternative method for making the present pressure sensor in which the core is etched to form a recess, and a diaphragm is bonded to the unetched cladding.

FIG. 8 shows an alternative embodiment having a weight bonded to the diaphragm, to render the diaphragm sensitive to acceleration and mechanical vibrations.

DETAILED DESCRIPTION OF THE INVENTION

The present invention provides an optical fiber pressure sensor having a short length of hollow tube bonded to an endface of an optical fiber. A pressure-sensitive diaphragm is bonded to the opposite end of the hollow tube. The fiber endface and diaphragm define an etalon cavity. The diaphragm flexes in response to applied pressure, impact, vibrations or acoustic waves. The flexing diaphragm varies the etalon cavity length. The etalon cavity length is normally approximately equal to the length of the hollow tube. The fiber, hollow tube, and diaphragm are preferably made of the same material (e.g. fused silica or sapphire). The fiber, hollow tube, and diaphragm can all be bonded by fusion bonding at high temperature. The hollow tube can be formed by preferentially etching the core of a fiber. In an alternative embodiment, the fiber core is preferentially etched, and the diaphragm is bonded to the unetched cladding.

FIG. 1 shows a side view of an optical fiber pressure sensor according to the present invention. The optical fiber pressure sensor comprises an optical fiber 20 having a core 22 and cladding 24. The fiber has an endface 25. The endface 25 can be cleaved or polished, and is preferably orthogonal to the fiber axis. A hollow tube 26 is bonded to the fiber endface 25. A pressure-sensitive diaphragm 28 is bonded to the tube 26 opposite the endface 25. The endface 25 and diaphragm 28 define a Fabry-Perot etalon cavity having a cavity length 30. In operation, the cavity length 30 varies with pressure or force applied to the diaphragm 28 (e.g., applied pressure, impact, vibrations, or acoustic waves).

The diaphragm 28 has thickness 34 and a freestanding diameter 36. The diaphragm thickness 34 can be in the range of about 1–100 microns; more typically the diaphragm thickness 34 will be in the range of about 2–25 microns. The diaphragm must be thin enough to flex under applied pressure. The freestanding diameter will typically be the same as the inner diameter of the tube 26. Preferably, the freestanding diameter 36 is equal to or greater than a diameter of the fiber core 22, though this feature is optional. The freestanding diameter can be in the range of about 5–75 microns, for example.

In an alternative embodiment, the diaphragm can have a layered structure comprising layers of glass, silica, polymers or ceramics.

The diaphragm thickness 34 and freestanding diameter 36 will influence the pressure sensitivity and operating pressure range of the sensor. A relatively thick diaphragm and/or small freestanding diameter are needed for sensing high pressures. For example, with a freestanding diameter of about 75 microns, for sensing pressure in the range of about 5000–10,000 PSI, the diaphragm can be about 4.90–5.85 microns thick; for sensing pressures in the range of about 1–200 PSI, the diaphragm can be about 0.585–2.19 microns thick.

The cavity length 30 (and tube length 32) can be in the range of about a few microns to millimeters, for example. More typically, the cavity length 30 will be in the range of about 5–60 microns.

The fiber is preferably a conventional index-guided single mode optical fiber, but can also be a photonic-crystal fiber, a holey fiber, or a multi-mode fiber. The fiber can have a graded-index or step index, or any other light-guiding profile or structure.

Preferably, the fiber 20, tube 26 and diaphragm 28 are made of the same material, for example silica. Uniform material construction tends to reduce thermal expansion mismatch stress and associated temperature sensitivity. The fiber, tube and diaphragm can also be made of materials such as borosilicate glass or other glasses, sapphire, crystalline quartz or silicon. With fused silica components, the present sensor can operate at temperatures up to about 700° C. With a uniform sapphire construction, the maximum operating temperature can be increased to about 2000° C. Sapphire provides exceptional high temperature stability and high pressure performance.

The bonds between the fiber 20, tube 26, and diaphragm 28 can be fusion bonds made by a fusion splicer. A fusion splice bond is particularly well suited for use with fused silica, glass or sapphire components. The fusion splice bonds can be made with a conventional electric-arc fusion splicer, as described below. The fiber, tube, and diaphragm can also be bonded in other ways, for example by anodic bonding, direct bonding, hydroxide bonding, agglutinating or by conventional adhesives such as sealing glasses or epoxy. For more information on anodic bonding, see "*The Mechanism of Field Assisted Silicon-Glass Bonding*" by Y. Kanda, K. Matsuda, C. Murayama, and J. Sugaya, Sensors & Actuators, vol. A21, pp. 939–943, 1990, which is hereby incorporated by reference.

The etalon cavity can be hermetically sealed, or can be open to the external environment. If the cavity is sealed, it can be pressurized or evacuated to alter the measurement range or sensitivity. A sensor with a sealed cavity can measure both static pressure and dynamic pressure.

If the sensor is open to the environment, then the pressure sensor will be responsive to only dynamic changes in pressure. The cavity can have a small orifice 33 to provide a fluidic connection between the cavity and external environment.

Also, it is noted that thin film coatings can be provided (e.g., by sputtering or other processes) on the fiber endface 25 and diaphragm 28 to enhance reflectivity and thereby increase the amplitude of optical interference effects in the etalon. For example, metals (e.g., gold), dielectrics (e.g., silicon, or $TiO_2$) will increase the amount of reflection. Increased interference amplitude in the etalon will tend to increase resolution and accuracy, as known in the art of etalon-based sensors.

FIG. 2 illustrates An exemplary method for using the present sensor for pressure measurements. A light source is coupled to the fiber 20 with the sensor at the fiber tip. A coupler 40 receives light reflected from the sensor etalon cavity, and sends the reflected light to a detector. Pressure applied to the sensor displaces the diaphragm and thereby varies the reflectivity of the etalon cavity. The applied pressure can be inferred from the diaphragm displacement and corresponding etalon reflectivity. The light source can interrogate the sensor with a single wavelength, or multiple wavelengths, or even white light. Multiple wavelength interrogation can provide a wide dynamic range of pressure measurement. Methods for measuring pressure by optical interrogation of a variable length etalon cavity are well known in the art.

The present pressure sensor generally has a very high resonant frequency as a result of its small size. Hence, the present sensor is well suited for measuring rapidly changing dynamic pressures. Also, the present sensor tends to have a highly linear response and very low hysteresis.

FIGS. 3a–3d illustrate a preferred method for making the present optical fiber pressure sensor.

FIG. 3a: The optical fiber 20 and a long section of hollow tube fiber 42 are bonded with a fusion splice 44. The fusion splice may be formed in a conventional electric-arc fusion splicer. The surface of the fusion splice 44 may be slightly uneven as shown. The hollow tube fiber may be fabricated from a hollow tube preform drawn into a fiber, in a manner analogous to making conventional optical fiber.

FIG. 3b: The hollow tube fiber 42 is cleaved so that a short section remains on the optical fiber 20. Cleaving can be performed with a conventional diamond fiber cleave tool. Preferably, cleaving is performed with high accuracy (within a few microns or less) so that the length of the bonded hollow tube is accurate. To achieve high accuracy, cleaving can be performed under a microscope. Alternatively, after cleaving, the hollow tube can be shortened by chemical etching or polishing.

FIG. 3c: A solid rod is fusion spliced to the hollow tube. The solid rod can be a conventional optical fiber, or a glass or fused silica fiber without any index variation or doping. The fusion splice may be formed in a conventional electric-arc fusion splicer.

FIG. 3d: The solid rod is cleaved, leaving the thin diaphragm attached to the hollow tube 26. Optionally, after cleaving, the diaphragm is thinned by polishing or chemically etching (e.g., in buffered HF) an exterior surface 48 of the diaphragm. If etching is performed, the exterior surfaces of the hollow tube 26 and fiber 20 can be covered with a mask material (e.g., metallization or polymer film) resistant to the etchant. Etching is generally preferred over polishing for final diaphragm thickness adjustment because etching for a controlled duration can provide diaphragm thickness with high (e.g., submicron) accuracy. The pressure sensitivity of the diaphragm can be monitored while the diaphragm is being thinned.

It is noted that the manufacturing process illustrated in FIGS. 3a–3d employs conventional and well-known fiber splicing and cleaving tools. Consequently, the present pressure sensor is simple and inexpensive to fabricate. Additionally, the materials required for construction (hollow tubes and solid fibers) are commercially available and very inexpensive.

The present sensor has high mechanical strength and smooth optical surfaces that minimize optical scattering. These features are provided as a result of the cleave and splice manufacturing method. The present sensors tend to have higher mechanical strength and lower scattering compared to fiber sensors made by etching or other destructive methods.

Although it is usually preferable for the fiber 20, hollow tube 26 and diaphragm to have the same outer diameter, this is not necessarily so. In alternative embodiments, the fiber 20, hollow tube 26 or diaphragm 28 can have relatively larger or smaller diameters than the other components. For example, the hollow tube 26 and diaphragm can both have an outer diameter smaller than the outer diameter of the fiber 20.

FIG. 4 shows a sensor made according to an alternative embodiment in which the diaphragm is fabricated from a thin plate instead of a solid rod. Cleaving is not required to create the diaphragm 28 of FIG. 4. Instead, the end of the hollow tube is bonded to the thin plate, and then excess thin plate material is removed by etching or cleaving. When the diaphragm is made from a wafer, the diaphragm 28 might be wider than the hollow tube 26 as shown in FIG. 4.

FIGS. 5a–5c illustrate an alternative method for making the present optical fiber pressure sensors.

FIG. 5a: The optical fiber 20 and a long section of doped core fiber 52 are bonded with a fusion splice 44. The doped core 54 is necessarily doped with a dopant that renders it more susceptible to etching by chemical etchants compared to an etchant-resistant cladding 56. For example, if the fiber 20 and fiber 52 are primarily made of fused silica, then the doped core can be made of germanium or fluorine-doped silica to render it more susceptible to etching by HF. In this case, the cladding 56 can be made of undoped fused silica.

FIG. 5b: The doped core fiber 52 is cleaved so that a short portion remains on the optical fiber 20.

FIG. 5c: The doped core 54 is removed by chemical etching, for example in buffered HF. The cladding 56 becomes the hollow tube 26. Etchants that can be used include hydrofluoric acid (HF) or buffered hydrofluoric acid (ammonium bifluoride), or any solution capable of etching glass.

For more detailed information on fiber core removal by etching, see "Controlled Core Removal From a D-shaped Optical Fiber" by Douglas J. Markos, Benjamin L. Ipson, Kevin H. Smith, Stephen M. Schultz, Richard H. Selfridge, Thomas D. Monte, Richard B. Dyott, and Gregory Miller, Applied Optics, Vol. 42, No. 36, pp. 7121–7125. December 2003, which is herein incorporated by reference.

If sapphire fibers are used, then a chlorine-containing plasma can be used as the etchant. For example, a $BCl_2$/HBr inductively coupled plasma can be used to achieve a high rate of sapphire etching, with a high selectivity over photoresist.

After the doped core 54 is removed by etching in FIG. 5c, the diaphragm 28 can be formed by fusion splicing and cleaving as illustrated in FIGS. 3c and 3d. Alternatively, the diaphragm is formed from a thin plate or wafer bonded to the hollow tube 26.

FIG. 6 shows an alternative embodiment having an etchant protection layer 50 disposed on the fiber 20. In this case, the etchant protection layer comprises the fiber endface. The etchant protection layer 50 can comprise fused silica, silicon nitride or other etch-resistant and transparent materials. The etchant protection layer 50 can be formed by sputtered $SiO_2$, or by fusion splicing a solid rod to the fiber 20 and then cleaving the rod (i.e., in a manner analogous the steps shown in FIGS. 3c and 3d). The etchant protection layer protects the fiber enface 25 from etchant used to remove the doped core 54. Without the etchant protection layer, the endface 25 might be damaged or roughened when the doped core 54 is removed.

FIGS. 7a–7c illustrate yet another method for making the present optical fiber pressure sensor. In this embodiment, the doped core 54 is recessed by etching, and the diaphragm is bonded to the etch-resistant cladding 56.

FIG. 7a: The doped core is recessed by etching with an etchant that removes the core 54 faster than the etch-resistant cladding 56. The depth of the recess can be controlled by the etching time. The depth of the recess determines the etalon cavity length. The depth of the recess can be in the range of 1–100 microns, for example, or more typically in the range of 5–40 microns.

FIG. 7b: A solid rod is fusion spliced to the cladding 56.

FIG. 7c: The solid rod is cleaved so that a thin diaphragm 28 remains attached to the cladding 56. As described above, the thickness of the diaphragm can be adjusted by controlled etching of the diaphragm.

In the method illustrated in FIGS. 7a–7c, it is noted that no photolithography or mask materials are required. The absence of photolithography and masking make the method of FIGS. 7a–7c very simple and cost-effective.

FIG. 8 shows an alternative embodiment having a weight 60 bonded to the diaphragm 28. The weight 60 can be bonded to the diaphragm 28 by a fusion splice, for example. The weight is preferably made of glass or other ceramic, but can also be made of metal. The weight is preferably supported on the freestanding region of the diaphragm. The weight renders the sensor sensitive to acceleration and mechanical vibrations. Acceleration or mechanical vibrations experienced by the fiber 20 cause the weight to apply inertial force to the diaphragm, thereby altering the cavity length and generating a detectable optical signal. The acceleration sensitivity of the fiber sensor will be highly directional and oriented in the direction of the fiber axis. It is noted that the acceleration sensor can also be sensitive to pressure.

The present sensors are very small and can be employed in dense arrays to provide high resolution 2-D or 3-D sensing of pressure fields, mechanical vibrations, acceleration or acoustic waves, for example.

It is also noted that the present pressure sensor is well suited for use in chemically sensitive environments, since it can be made of only fused silica, sapphire or other relatively inert materials. For example, the present pressure sensor is biocompatible and can be used in medical and biological applications.

It is also noted that the present pressure sensor can be made of plastic or polymeric fibers. In this case, the fiber 20, hollow tube 26 and diaphragm 28 can be bonded with adhesives, with solvents, or by heat welding or ultrasonic welding.

It will be clear to one skilled in the art that the above embodiment may be altered in many ways without departing from the scope of the invention. Accordingly, the scope of the invention should be determined by the following claims and their legal equivalents.

What is claimed is:

1. An optical fiber sensor, comprising:
    a) an optical fiber with a fiber endface;
    b) a hollow tube bonded to the fiber endface;
    c) a diaphragm bonded to the hollow tube opposite the fiber endface, whereby the fiber endface and diaphragm define an etalon cavity.

2. The optical fiber sensor of claim 1, wherein the hollow tube has a length in the range of 1–1000 microns.

3. The optical fiber sensor of claim 1, wherein the hollow tube has an outer diameter approximately equal to an outer diameter of the optical fiber.

4. The optical fiber sensor of claim 1, wherein the optical fiber, hollow tube and diaphragm are made of a material selected from the group consisting of silica and sapphire.

5. The optical fiber sensor of claim 1, further comprising a weight bonded to the diaphragm.

6. The optical fiber sensor of claim 1, wherein the diaphragm has a thickness in the range of 1–1000 microns.

7. The optical fiber sensor of claim 1, wherein an exterior surface of the diaphragm is a chemically etched surface.

8. The optical fiber sensor of claim 1 further comprising an etchant protection layer on the optical fiber endface.

9. The optical fiber sensor of claim 1 further comprising a first fusion splice bonding the hollow tube to the fiber endface and a second fusion splice bonding the hollow tube to the diaphragm.

10. The optical fiber sensor of claim 1 further comprising an orifice in said hollow tube which extends from said etalon cavity to an outside wall of said hollow tube.

11. The optical fiber sensor of claim 1 further comprising a coating on at least one of said fiber endface and said diaphragm.

12. The optical fiber sensor of claim 11 wherein said coating is a metal.

13. The optical fiber sensor of claim 11 wherein said coating is a dielectric.

14. The optical fiber sensor of claim 1 further comprising a means to detect one of applied pressure and impact.

15. The optical fiber sensor of claim 1 further comprising a means to detect one of vibrations and acoustic waves.

16. The optical fiber sensor of claim 5 further comprising a means to detect one of acceleration and mechanical vibrations.

17. An optical fiber sensor, comprising:
    a) an optical fiber with a relatively etchable core, and a relatively etch-resistant cladding, wherein the etchable core is recessed;
    b) a diaphragm bonded to the etch-resistant cladding.

18. The optical fiber sensor of claim 17 wherein the optical fiber and diaphragm are primarily made of silica.

19. The optical fiber sensor of claim 17 wherein the etchable core is doped with a material selected from the group consisting of germanium and fluorine.

20. The optical fiber sensor of claim 17 wherein the diaphragm has a thickness in the range of 1–1000 microns.

21. The optical fiber sensor of claim 17 wherein an exterior surface of the diaphragm is a chemically etched surface.

22. A method for making an optical fiber pressure sensor, comprising the steps of:
    a) fusion splicing a hollow tube to an endface of an optical fiber;
    b) cleaving the hollow tube so that a portion of the hollow tube remains attached to the fiber endface;
    c) fusion splicing a solid rod to a cleaved end of the hollow tube;
    d) cleaving the solid rod so that a diaphragm remains attached to the hollow tube.

23. The method of claim 22 further comprising the step of chemically etching an exterior surface of the diaphragm to adjust a diaphragm thickness.

* * * * *